United States Patent Office 2,956,038
Patented Oct. 11, 1960

2,956,038

ERASABLE GRAPHITIC WRITING SOLUTION

David Juelss, Brooklyn, N.Y., and Andrew Torok, Morris Plains, N.J., assignors to Venus Pen & Pencil Corporation, Hoboken, N.J., a corporation of New York No Drawing. Filed Dec. 12, 1958, Ser. No. 779,829

6 Claims. (Cl. 260—33.6)

This invention relates to improvements in erasable writing fluid and more particularly relates to an erasable graphitic writing fluid composed of finely divided graphite particles dispersed in a mineral oil carrier in which is dissolved a polydiene resin made by polymerizing the mono- and di-olefins from cracked petroleum.

The colloidal dispersion of graphite particles and other writing pigments in various vehicles is well known. For example, graphite has been treated with deflocculating agents which results in a colloidal graphite which may be readily suspended in various media with a dispersing agent. Under these conditions the graphite appears to have a Brownian movement and is not subject to settling out of the suspension. In the manufacture of writing leads for the conventional lead pencil a suspension of such graphite and a binding agent such as clay in water is dehydrated and solidified into the various degrees of lead from very soft to extra hard.

In the past inks have been used generally in writing instruments where it was desirable for the markings to be in a more permanent form. Since the inks are liquid and the pigments of smaller particle size than the graphite particles of writing leads they tend to be absorbed by the body of the paper or other writing surface and therefore are not erasable. Furthermore, inks deposit considerably more material on a writing surface than does a writing lead. However, with the advent of the ball-point pen, the viscosity of the inks has been increased (thickened) with resins and the flow of ink limited by the ball, but due to the nature of the carriers, minute particle size of the pigments, or use of dyes for the coloring medium, the materials are still absorbed sufficiently by paper to be non-erasable.

There are many pigmented inks presently available which include carbon black as the primary pigment. Small traces of graphite are also sometimes added to carbon black inks. Carbon black and similar pigments break down readily to extremely fine particle sizes that penetrate into the pores of a paper surface and thus cannot be easily erased. Other standard inks use soluble dyes as the coloring medium and these penetrate the paper fibers to become indelible as well as non-erasable.

Resins are commonly used in ball-point inks to increase the viscosity thereof and to insure tackiness of the ink to the ball of the pen but the resins employed heretofore have not been absorbed by the paper with the carrier but remained on the paper surface and became oxidized to leave an unerasable mark.

In writing with the ordinary erasable leads which are generally composed largely of graphite and a clay binder, the material is not absorbed by the paper but remains on the surface thereof and is thus readily erasable. However, if the graphite is suspended in a liquid vehicle it is necessary that the carrier be completely absorbed without appreciable absorption of the graphite into the body of the paper if the graphite is to remain erasable. Moreover, the carrier must be colorless if a more or less residual permanent marking is to be avoided even when the graphite is erased.

Furthermore, if a suspension of graphite is to be utilized in a ball-point writing instrument the graphite particles must be small enough to pass readily through the space between the writing ball and the instrument barrel. At the same time, the particles must be sufficiently large so that they are not absorbed within the body of the paper.

In addition, consideration must be given to the viscosity of the carrier and whether the writing fluid will tack to the ball and then be transferred from the ball onto a paper surface. Heretofore the industry has not overcome these various problems successfully.

It is an object of this invention to provide a writing fluid which leaves an erasable graphitic mark on an absorbent surface such as paper.

It is a further object of this invention to provide an erasable graphitic writing fluid which may be used in either ball-point or other type writing instruments which limit the flow of fluid onto a writing surface.

It is another object of this invention to provide an erasable graphitic writing fluid that has sufficient body and tack for use in ball-point writing instruments.

We have found that a satisfactory graphitic writing fluid may be secured by suspending a fine crystalline flake graphite of a suitable particle size range in white mineral oil of medium viscosity, i.e., within the viscosity range of a ball-point pen ink carrier.

In order to insure sufficient body and tack we also include in the composition a resin compatible with the carrier; that is to say, it is soluble in the carrier and will not separate from the carrier when the liquid composition is laid down on an absorbent surface such as writing paper. The presence of a resin film on the paper surface after the marking has been applied is undesirable because many resins tend to dry or oxidize and are thus not subject to removal by simple erasing. Furthermore, the presence of a residual film on the surface in association with the graphite particles, by itself tends to interfere with the erasability of the graphite marking. Thus the resin must not only be soluble in the carrier in the presence of the graphite but remain in the carrier during the absorption of the carrier by a paper body and be carried therewith into the paper body. In addition, the resin must not impart color, drying properties or polar characteristics to the carrier.

The most desirable resin having these properties has been found to be a polymerized derivative of the mineral oil itself or its origin. Such a resin has similar properties as the carrier in regard to polarity, etc., is very compatible with the carrier, and does not separate from the carrier upon writing. In fact, the resin appears to serve as a concentrated portion of the carrier. It is absorbed into the body of the paper along with the primary carrier and thus leaves only graphite on the paper surface which is readily erasable. We have found such a polydiene resin that gives excellent results, namely a resin made by polymerizing the mono- and di-olefins from cracked petroleum and having the following generalized structure:

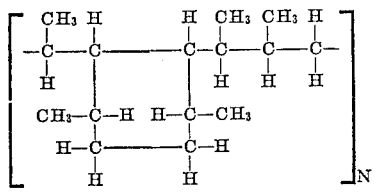

It has a very light color, excellent solubility in mineral oil and is very compatible in all respects with the mineral oil carrier. The resin is available under the trademark "Piccopale" 100, 85 or 70, the number indicating a melting or softening point (ball and ring) in degrees C. The resin further has a specific gravity at 25° C., of .970 to .975, a refractive index at 20° C. of 1.5116, an acid number less than one, an iodine value (Wijs) of 120, a bromine number of 7.3 and a molecular weight of approximately 1100.

The size of the crystalline graphite is important because if it is too small, the graphite will tend to become absorbed and thus be difficult or impossible to erase. However, in dealing with ball-point writing instruments, it is necessary that the particle size be small enough so that the space between the ball and its holder will not be clogged by the graphite particles. We prefer to use a particle size of from about 2 to 4 microns although sizes within the broader limits of the range 0.5 to 5 microns may be used with less satisfactory results. This range is sufficiently small for use in ball-point writing instruments but yet large enough so that the plate-like structure of the particles tend to form an overlapping scaly film on a writing paper surface which insures a satisfactory marking and yet is readily erasable. Other writing instruments limit the flow of fluid such as those having capillary tubes which the writing fluid must pass through. The upper size of the range may be changed according to the capacity of the capillary tube but the lower size would remain about the same since it depends on absorption by paper surfaces.

It will be understood that for this specification and the following claims, it is intended that erasable markings are those that can be removed from a writing paper surface by rubber erasers, etc., in the same manner that regular lead pencil markings can be removed, i.e., the mark is fairly easily removed from a writing paper without apparent effect on the surface thereof. It is well recognized that inks, including even indelible inks, can be removed from paper by prolonged erasing or other rubbing means that also remove paper fibers but such markings are not considered erasable herein or by the art.

*Example*

The following example illustrates a preferred embodiment of this invention. Fifteen parts by weight of a crystalline graphite having an average particle size of 2 microns is dispersed in 65 parts of a mineral oil of medium viscosity to which is then added 20 parts of "Piccopale 100." This is heated at 120° C. and stirred until the resin is completely in solution. The heating is necessary only to complete the solution in less time. The fluid is then cooled and may be milled and/or strained.

The resin may range from 10 to 30% although 15 to 25% is the preferable range and the graphite may range from 5 to 20% by weight of the mineral oil carrier. It is desirable, of course, to include as much graphite as possible and the paper range is generally limited by the viscosity of the resultant fluid. Since the resin also increases the viscosity it is desirable to have as little resin as possible but the lower limits of the resin are controlled by the degree of tackiness in the resultant writing fluid.

The preferred mineral oil has an API gravity of 20.1 at 60° F., a viscosity of 69 Saybolt seconds at 210° F., and a Pensky-Martens flash point of 355° F. A viscosity range from 65 to 370 Saybolt seconds at 210° F. is suitable.

This application is a continuation-in-part of our copending application, Serial No. 508,816, filed May 16, 1955, now abandoned.

We claim:

1. An erasable graphitic writing fluid comprising a mineral oil carrier, colloidal graphite dispersed in said carrier, and dissolved in said carrier, the resinous polymerization product obtained by catalytic polymerization of a mixture of unsaturated monomers derived from deep cracking petroleum, said resinous polymerization product having a softening point (B. & R.) within the range of approximately 70 to 100° C., a specific gravity at 25° C. of .970 to .975, a refractive index at 20° C. of 1.5116, an acid number less than one, an iodine value (Wijs) of 120, a bromine number of 7.3 and a molecular weight of approximately 1100.

2. An erasable graphitic writing fluid as claimed in claim 1 wherein said fluid contains 5 to 20% of said graphite, 10 to 30% of said resin, and said mineral oil of between 65 to 370 Saybolt seconds at 210° F. as the remainder.

3. An erasable graphitic writing fluid as claimed in claim 2 wherein said colloidal graphite consists substantially of particle sizes from about 0.5 to 5 microns.

4. An erasable graphitic writing fluid as claimed in claim 2 wherein said colloidal graphite consists substantially of particle sizes from about 2 to 4 microns.

5. An erasable graphitic writing fluid as claimed in claim 4 wherein said mineral oil is about 69 Saybolt seconds at 210° F.

6. An erasable graphitic writing fluid as claimed in claim 4 wherein said resinous polymerization product has a melting point of about 100° C.

References Cited in the file of this patent

UNITED STATES PATENTS 2,894,925   Morris et al. _____ July 14, 1959